July 31, 1934.  O. H. A. KRÖGER ET AL  1,968,693
APPARATUS FOR THE PRODUCTION OF GLASS SILK
Filed May 27, 1931   2 Sheets-Sheet 1

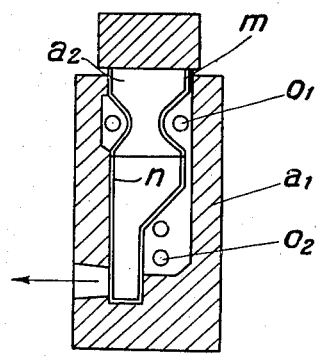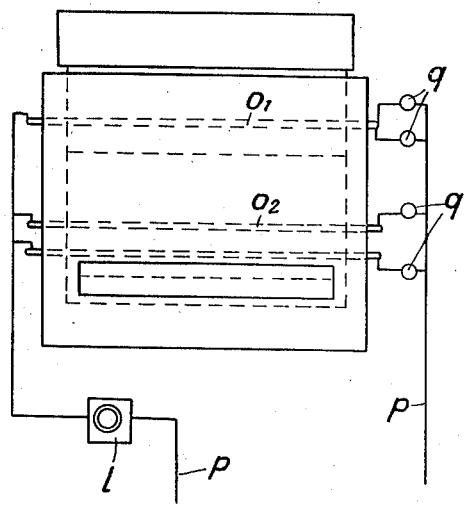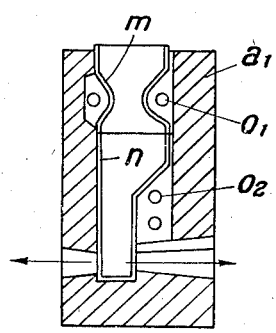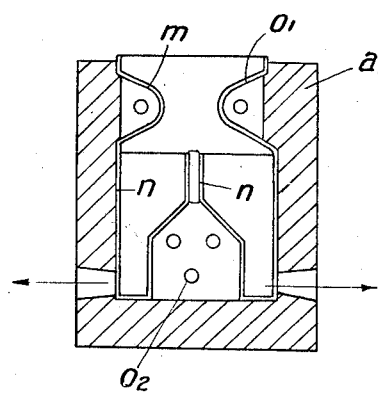

Patented July 31, 1934

1,968,693

UNITED STATES PATENT OFFICE 1,968,693

APPARATUS FOR THE PRODUCTION OF GLASS SILK

Otto Henry Amandus Kröger, Altona-Klein-Flottbeck, and Otto Adolf Oswald, Hamburg, Germany Application May 27, 1931, Serial No. 540,470
In Germany May 27, 1930

1 Claim. (Cl. 49—17)

The production of glass threads or so called glass silk is as a rule effected by drawing out the threads from glass rods. This process is uneconomical since it is necessary first to prepare the glass rods from a mass of glass.

It is known to draw glass threads direct from a liquid glass mass through nozzles disposed at the bottom of a trough or furnace containing the glass mass, whereby a drop of molten glass issuing from the nozzle falls downwards and becomes attached to a rotating device, so that, owing to the rotation of the device, threads are drawn from the bottom of the trough or furnace. It has also been proposed to deflect the glass drop and thread from the direction of fall and to dispose a drum not directly below the nozzle, but somewhat to one side.

All these methods, however, have the disadvantage that the spinning can only be effected from the bottom of a trough or furnace charged with liquid glass, and which only contains liquid glass, and that, owing to the necessity of spinning downwards, the whole apparatus is complicated and costly.

The present invention provides an excellent, economical, and simple method for the continuous production of glass silk, and differs from the known methods in that the spinning is effected directly from the furnace, which is continuously charged with solid material, the mass in the furnace being continuously brought into a liquid, pasty condition. Further characteristics of the method are that the spinning is not effected from the bottom, but from the side wall or from several, preferably two, side walls, that the direction of spinning is substantially horizontal, and that the spinning is effected whilst the glass mass is in a liquid, pasty condition.

In contradistinction to the known methods, in the method according to this invention, the necessity of allowing the glass drop to fall, and of spinning downwards, which were hitherto considered indispensable, are avoided, whereby manifold advantages are obtained.

In order to carry out the method according to the invention a shaft furnace is employed which is small as compared with the spinning drum, and the furnace is constructed so as to be movable relatively to the stationary spinning drums. As spinning drums, an aggregate of two or more drums are employed, each spinning drum being provided with a peripheral projection engaging with the next drum.

The accompanying drawings illustrate embodiments of the apparatus according to the invention wherein:—

Figure 1:
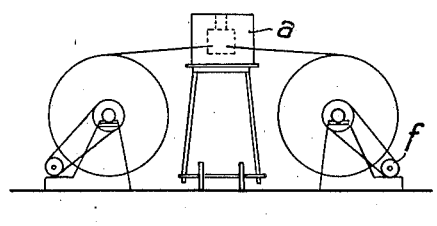
Figure 2:
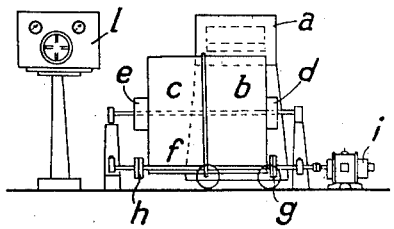
Figure 3:
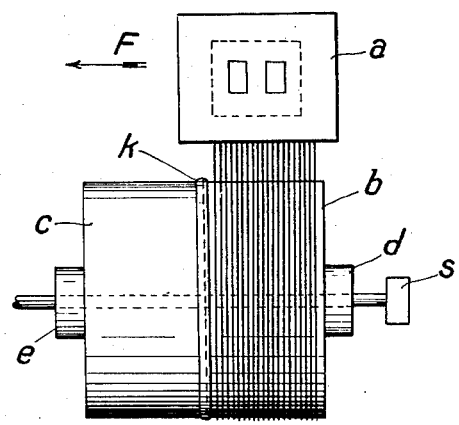

Figure 1 is a side elevation,
Figure 2 is a front elevation,
Figure 3 shows the drums and the manner of applying the threads to the drum,
Figure 4 is a vertical section of a modified form of furnace,
Figure 5 is a front elevation of Figure 4, and
Figures 6 and 7 are vertical sections of furnaces adapted for spinning from two sides.

The plant consists of the comparatively small movable furnace, the drums, and the switch apparatus. The furnace is shown at $a$ and the drums at $b$ and $c$. Each of the drums is provided with driving pulleys $d$ and $e$. In front of the drum is a driving shaft $f$ with two pairs of pulleys $g$ and $h$, which are constructed as fixed and loose pulleys. The motor $i$ operates the drums, one of which is provided with a peripheral projection $k$ which engages with the second drum. The switch apparatus $l$ serves to regulate the furnace.

The method of operation is as follows:—

The furnace is raised to the temperature necessary for melting the glass by means of an electric resistance circuit and switching apparatus, and is then filled with the glass. During the spinning process the furnace is charged with further solid material. The liquid, pasty mass is spun through nozzles from the furnace on to one of the two drums until the latter is so far covered that it has to be stopped. Before stopping, the second drum is set in operation by means of the loose pulley, and the furnace, which is disposed on a movable frame, is slowly pushed over in the direction of the empty drum whereby the threads pass from one drum to the other. This action is repeated as soon as the next drum is completely covered. The peripheral projection, disposed on one drum, engages with the next drum so as to cover the intervening space between the two drums, thereby enabling the spun threads to slip over, and is of particular importance.

In order efficiently to utilize the heat of the furnace the threads are drawn out on two sides; it is, however, also possible to utilize more than two external walls of the furnace.

According to another embodiment of the invention an externally heated hopper is employed in conjunction with the shaft furnace. The glass is continuously fed in the form of fragments or pieces through this hopper into the furnace.

If the hopper is not heated the glass particles remain adhering to the walls of the hopper, since they become sticky even in this part. As a result the temperature of the furnace rises, because the glass particles do not contact directly with the furnace and consequently no heat of fusion can be given off to freshly added glass. The disadvantage is therefore incurred that the process is not capable of being regulated and the glass in the trough becomes so thinly liquid, that it flows in liquid form out of all the holes and yet the glass adhering to the shaft does not melt.

The spinning of the glass threads then ceases, since too hot and too thinly liquid glass cannot be spun, so that the furnace has to be stopped and cleared out, with a consequential waste of time. All this is avoided by employing a heated hopper according to this invention. This hopper is with advantage constricted on or near its central horizontal plane, the constrictions extending parallel to the longitudinal axes of the furnace and the hopper.

The hopper may also be disposed on an aggregate of two or more shaft furnaces.

For the purpose of heating the furnace and the hopper an external electric resistance heating device may be employed with advantage, the resistance elements being externally disposed in the constrictions parallel to the longitudinal axis of the hopper or in the constriction of the furnace shaft formed by the cross-sectional diminution. All the heating resistances are advantageously adjusted so as to be capable of being individually cut out of the circuit.

The glass is melted at the top of the furnace and the threads are drawn off from below. As shown in Figures 6 and 7, the spinning is effected from both sides. The furnace consists of the drawing trough $a_1$ with the melting trough $a_2$ disposed thereabove or the melting trough may be constructed in one piece with the drawing trough. The electric heat resistances are shown at $o_1$, $o_2$, the current leads at $p$ and the switches of the heat resistances at $q$. The regulating apparatus $l$ is also disposed in the circuit.

The modus operandi of the glass spinning furnace provided with a preliminary melting device is as follows:—

Current from a suitable source is conveyed by means of the two cables $p$ to the heat resistances $o_1$, $o_2$ and the furnace raised to the melting temperature. The furnace is then filled with glass fragments, which gradually sink together and fill up the melting trough in a pasty condition. The heat is then regulated so that the glass forms a pasty, liquid mass in the lower portion of the melting trough i. e. at the height of the drawing apertures or nozzles. As soon as spinning commences the pre-melting device is set in operation so that the glass, freshly introduced into the furnace, is preheated or melted at a temperature above that of the drawing trough. The arrangement of the switch $q$ is of particular advantage as it enables each individual heat resistance to be switched in and out of circuit and the heat to be correctly distributed. It is only by means of this switch that it is possible, at the commencement and also during the operation, to heat the furnace at the bottom or at the top, quite apart from the subsequent further regulation, by means of the main regulator $l$. Irregularities in the distribution of heat can also be produced by exchanging individual heat resistances, since a new resistance element absorbs considerably more heat than one which has been in service for some time. In this case the switches $q$ are of great service for the distribution of heat. The drawing out of the threads may be effected from one side or both sides as shown in Figure 4 and Figures 6 and 7 respectively.

We claim:

An apparatus for the manufacture of glass threads comprising a furnace, independent top and bottom heaters adjacent said furnace for continuously melting and bringing glass to a predetermined liquid-pasty condition, horizontal spinning nozzles adjacent the bottom of the furnace, and means for continuously receiving the spun glass thread from said nozzles including a plurality of drums of substantially the same diameter coaxially mounted end to end, one of said drums having a peripheral projection extending over the gap between said drum and an adjacent drum, said furnace and receiving means being movable relative to one another in the axial direction of the drums whereby the said means may operate continuously to receive and gather the threads from said nozzles.

OTTO HENRY AMANDUS KRÖGER.
OTTO ADOLF OSWALD.